United States Patent
Wang et al.

(10) Patent No.: US 8,817,710 B2
(45) Date of Patent: Aug. 26, 2014

(54) NETWORK ENTRY AND DEVICE DISCOVERY FOR COGNITIVE RADIO NETWORKS

(75) Inventors: Jianfeng Wang, Ossining, NY (US); Kiran Challapali, New City, NY (US)

(73) Assignee: Koninklijke Philips N.V., Eindhoven (NL)

(*) Notice: Subject to any disclaimer, the term of this patent is extended or adjusted under 35 U.S.C. 154(b) by 609 days.

(21) Appl. No.: 12/744,409

(22) PCT Filed: Nov. 24, 2008

(86) PCT No.: PCT/IB2008/054929
§ 371 (c)(1),
(2), (4) Date: May 24, 2010

(87) PCT Pub. No.: WO2009/069068
PCT Pub. Date: Jun. 4, 2009

(65) Prior Publication Data
US 2010/0246434 A1 Sep. 30, 2010

Related U.S. Application Data

(60) Provisional application No. 60/990,312, filed on Nov. 27, 2007.

(51) Int. Cl.
 *H04W 4/00* (2009.01)
 *H04W 72/04* (2009.01)
(52) U.S. Cl.
 CPC .................................. *H04W 72/044* (2013.01)
 USPC ......................................................... 370/329
(58) Field of Classification Search
 USPC ................................. 370/310–464
 See application file for complete search history.

(56) References Cited

U.S. PATENT DOCUMENTS 5,729,680 A 3/1998 Belanger
7,317,920 B2 * 1/2008 Rajkotia et al. ............... 455/450
(Continued)

FOREIGN PATENT DOCUMENTS

EP 1067812 B1 3/2006
WO WO 2007043827 A1 * 4/2007
(Continued)

OTHER PUBLICATIONS

Amir Ghasemi et al., "Optimization of Spectrum Sensing for Opportunistic Spectrum Access in Cognitive Radio Networks", Consumer Communication and Networking Conf., 2007, IEEE, pp. 1022-1026, xp021087937.

(Continued)

*Primary Examiner* — Kwang B Yao
*Assistant Examiner* — Juvnea Loo
(74) *Attorney, Agent, or Firm* — Larry Liberchuk

(57) ABSTRACT

A device (400) scans and classifies each channel within a spectrum of channels (215-270) as being occupied or unoccupied (255), and, if occupied, whether it is occupied by a primary user (240), a secondary user (230), or an unknown user (260). As a secondary device (400), transmissions are avoided on channels occupied by primary users (490). The device selectively joins an existing network of secondary devices, or establishes a new network on an unoccupied channel (125), based on the quality of service (QoS) that the channel can provide and/or other factors. If the device is paired with a target device (115), the paired device advertises itself on a selected channel (345-360) for a period that is at least as long as the time required to scan all channels, to facilitate discovery in the event that the target device is also in a search mode. The advertising duration randomly alternates (345) among integer multiples of the scan duration.

23 Claims, 3 Drawing Sheets

(56) References Cited

U.S. PATENT DOCUMENTS

| | | | |
|---|---|---|---|
| 7,457,295 B2* | 11/2008 | Saunders et al. | 370/395.21 |
| 7,564,878 B2* | 7/2009 | Stadelmeier et al. | 370/329 |
| 2004/0008641 A1* | 1/2004 | Sugaya et al. | 370/321 |
| 2004/0047324 A1 | 3/2004 | Diener | |
| 2004/0190521 A1* | 9/2004 | Rodin et al. | 370/395.2 |
| 2006/0030318 A1* | 2/2006 | Moore et al. | 455/434 |
| 2006/0067354 A1 | 3/2006 | Waltho | |
| 2006/0068820 A1* | 3/2006 | Sugaya et al. | 455/512 |
| 2007/0201423 A1* | 8/2007 | Laroia et al. | 370/345 |
| 2007/0206554 A1* | 9/2007 | Laroia et al. | 370/338 |
| 2007/0211679 A1* | 9/2007 | Laroia et al. | 370/338 |
| 2007/0247365 A1* | 10/2007 | Laroia et al. | 342/385 |
| 2007/0274275 A1* | 11/2007 | Laroia et al. | 370/338 |
| 2007/0286136 A1* | 12/2007 | Rittle et al. | 370/338 |
| 2008/0051099 A1* | 2/2008 | Moore et al. | 455/454 |

FOREIGN PATENT DOCUMENTS

| | | |
|---|---|---|
| WO | WO2007082246 A1 | 7/2007 |
| WO | WO 2007094604 A1 * | 8/2007 |

OTHER PUBLICATIONS

Guanbo Zheng et al., "Enhanced Energy Detector for IEEE 802.22 WRAN Systems Using Maximal-to-Mean Power Ratio", Wireless Communication Systems, 2007, ISWCS, 4th International Symposium on, IEEE, pp. 370374, XP031166793.

* cited by examiner

NETWORK ENTRY AND DEVICE DISCOVERY FOR COGNITIVE RADIO NETWORKS

This invention relates to the field of cognitive radio communications, and in particular to a method and system for network entry and device discovery for local/personal area unlicensed operation over TV bands.

Cognitive radio is a communication scheme in which a device monitors licensed channels for activity, and establishes communications only on an inactive channel. It is a particularly viable solution for providing unused communications bandwidth to local area communication networks, such as home networks. Such home networks are commonly used to allow devices and appliances within a household to communicate and interact with each other, generally under a user's direct or pre-programmed command. Such communications may range from a user command to preheat an oven, to the exchange of audio/visual information among cameras, recorders, displays, and the like.

Because many of the devices that may communicate over a local network are mobile, and because the same device may be a member of different networks at different locations, or even at the same location, and because the operating channel of the network may vary depending upon the activity on the available channels, the configuration, membership, and even the very existence of such a network is highly dynamic. Accordingly, techniques must be provided to enable a device to discover the presence of such dynamic networks, join an established network, and/or establish a new network on an available channel.

A number of different techniques have been proposed to enable device discovery and network entry in dynamic cognitive networks, generally based on random or exhaustive search techniques with minimal regard to efficiency and reliability. Consider, for example, the time required for two devices to find each other and establish (unlicensed) operation over conventional television broadcast bands. For the purposes of this disclosure, the authorized user of the band (i.e. the licensed broadcaster) is termed the primary user of the band/channel, and all other communicating devices on the band are termed secondary users. Unlicensed operation over TV bands requires a device to make sure there is no primary user before it attempts communication on a channel, which may take a long time. Moreover, a seeking device can not generally presuppose a pre-assigned channel where a target device or set of devices may be found, given the time-varying and unpredictable nature of channel occupancy. Typically, the number of available TV bands is about 30, and, even if the target device is actively transmitting on a single channel during the search period, the time to locate the target can amount to a few seconds, and this time will increase substantially if the target device is also searching among these 30 channels, and not actively transmitting on a single channel.

It would be advantageous to provide a protocol that facilitates efficient device discovery and network entry in a dynamic network environment. It would also be advantageous to provide a protocol that facilitates efficient peer-to-peer device discovery in a dynamic network environment.

These advantages, and others, can be realized by a method and system wherein a device scans and classifies each channel within a spectrum of channels, then selectively joins an existing network or establishes a new network based on the determined channel classifications, and based on the quality of service (QoS) that the channel can provide and/or other factors. If the device is paired with a target device, the scanning is terminated when the target device is found. If the target device is not found, the paired device advertises itself on a selected channel for a period that is at least as long as the time required to scan all channels, to facilitate discovery in the event that the target device is also in a search mode. The advertising duration preferably randomly alternates among integer multiples of the scan duration.

The invention is explained in further detail, and by way of example, with reference to the accompanying drawings wherein.

Throughout the drawings, the same reference numeral refers to the same element, or an element that performs substantially the same function. The drawings are included for illustrative purposes and are not intended to limit the scope of the invention.

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

As discussed above, the invention addresses devices and networks that are dynamically re-locatable among a variety of possible channels. In a typical embodiment, the possible channels are channels that are generally allocated or licensed to primary users, such as television broadcasters, but the actual occupancy of each channel varies. For example, due to the likelihood of interference, the allocation of television channels to broadcasters in a given area is restricted to every-other channel, leaving half of the channels in the available spectrum empty. In other environments, the occupancy of a channel by a primary user varies with time. Dynamically re-locatable networks can take advantage of the inefficiently utilized spectrum by establishing themselves on unused channels. For ease of understanding, the invention is presented using a one-to-one correspondence between defined channels and the utilization of the channel by a secondary user network. One of skill in the art will recognize, however, that multiple networks may be supportable within one channel, or, multiple channels may be required to support one network, without departing from the intent and scope of this invention.

Figure 1:
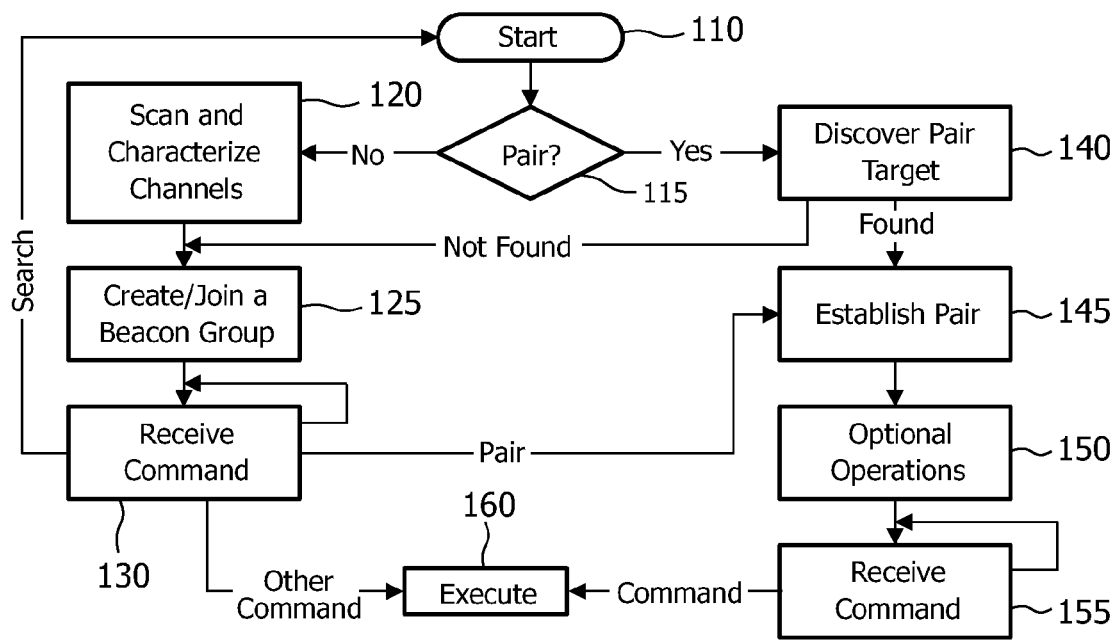
FIG. 1 illustrates an example flow diagram for device discovery and network entry.

FIG. 1 illustrates an example flow diagram for device discovery and network entry. The search process starts at 110. If, at 115, the device is not part of a pair, such as a master-slave pair, or a peer-to-peer pair, a general channel search and classification is performed, at 120. As discussed further below, each channel in the search spectrum is classified as being unoccupied, or occupied by a primary user, secondary user(s), or an unknown class of user. The primary user is an authorized/licensed user of a channel; the searching device, being a secondary user of the channel, is configured to avoid initiating transmissions on any channel that is classified as a primary channel. In like manner, the searching device is also configured to avoid transmitting on a channel being used by an unknown class of user. As discussed further below, the protocol used by secondary users preferably includes a means of self-identification by each device on the network, or at least an identification of the particular network. In a typical beacon-based protocol, the beacon signal that is broadcast by each device in a network is preferably configured to include a device identifier, and optionally, a network identifier.

At 125, the device either joins an existing network on a channel being used by other secondary users, or establishes a new network on an unused channel. Any of a variety of protocols may be used to effect the establishment of a new network, and/or to control access to the network and subsequent communication among members of the network. In a beacon-based system, a device establishes a new network by broadcasting a device beacon that includes the aforementioned device identifier and an identifier of the network, or type of network, as an invitation to other devices to join the network. Membership in the network may be open or selective, depending upon the parameters established when the network is created.

The choice of whether to establish a new network or to join an existing network is generally based on a variety of factors, including the characteristics of the particular device, as well as the characteristics of the available networks and channels. In an example embodiment, a rules-based algorithm is used to effect the selection.

An example set of rules for determining whether to join a discovered network includes, for example, establishing a connection with the network if the device recognizes an association with one or more of the secondary users in the network, or an association based on an identifier of the network. For example, the device may be a cell phone that has established an association with devices in a user's home network; whenever the cell phone is brought back into the vicinity of one or more of these devices, the cell phone will, by default, join the newly discovered/re-discovered network of these devices. Similarly, if an association is not recognized, or if associations to multiple networks are recognized, the selection of the network to join may be based on each available network's ability to provide a desired quality of service (QoS), including an assessment of the available throughput based on the monitoring of current traffic on each channel. If the device includes a display, the available networks may be displayed for direct selection by the user.

The choice of joining or establishing a network may also depend upon the particular type or class of device. If, for example, the device is one that typically provides control of other devices, such as a user's PDA, the default may be to establish a new network unless it is clear that an existing network is an appropriate network to join, based on either the presence or absence of other types of devices on the network. For example, a controlling-class device may avoid joining a network that includes another controlling-class device. Conversely, a controlled-class device, such as a household appliance, may be configured to give preference to any network that includes a controlling-class device.

One of skill in the art will recognize that other selection schemes may also be used. For example, the device may be configured to use a scoring system based on the membership of each network and the quality of service available. Based on the score, the device may be configured to select the network having the highest score, or establish a new network if the highest score is below some minimum threshold.

When a device joins a network, a setup process is generally initiated, wherein the device and network share information that facilitates subsequent operations of the network. In a basic setup, for example, the device may be assigned an IP-address by the network, or the device may inform the network of its predefined IP-address. In a home or office network, the device may inform the network of its capabilities and may request allocation of services or features from the network. Other devices in the network may modify their configuration to take advantage of the capabilities provided by the new device, or may advise the new device of their capabilities.

In a preferred embodiment, the devices are configured to share their assessments of the current channel, as well as other assessed channels. Of particular import, the devices are configured to maintain a consistent list of channels upon which primary users have been detected. Some devices, for example, may be in a 'fringe' area of a primary user's broadcast, and may not have detected the primary user's presence. Each device on the network preferably updates its classifications based on the determined classifications by other devices. Depending upon the particular environment, the network may be configured to effect an updating of the classifications by directing a periodic rescan and reclassification by all or some of the member devices.

Preferably, each device is user-controllable, using, for example, a MAC-layer management entity (MLME) that is configured to provide network control services. With regard to FIG. 1, in such an embodiment, after joining or establishing a network, the device waits for a command, at 130, then responds accordingly. If the command is to repeat the channel search and classification, the process loops to restart, at 110. If the command is to pair with a specific target device, the process branches to establish the pairing, at 145, discussed further below. Other commands are executed as appropriate, at 160.

If, at 115, the device is a 'paired' device, that is, a device that is configured to communicate with a particular other device or class of devices, in either a peer-to-peer or master-slave pairing, the device searches the spectrum of channels for the other/'target' device, as detailed further below.

If after a given number of tries, the device is unable to locate its target pair device, the device is preferably configured to actively advertise its presence, by either joining a discovered network or by establishing its own network, at 125, discussed above. If, on the other hand, the target device is found on a channel, the devices establish the pairing on the channel at which the target device is found, on an unused channel, or on a channel having an existing network of secondary users.

The pairing of devices generally includes establishing a secure and/or authenticated connection, via the exchange or creation of session keys and other security measures, illustrated in FIG. 1 as optional operations, at 150. Generally, the particular protocol provides expected rules of behavior for paired devices, such as a rule that requires a member of a pair to notify the other member whenever the member is leaving a network, changing its channel, and so on.

In a preferred embodiment, paired devices are also configured to identify at least one backup channel, for use in the event that communications are interrupted on their current channel, due, for example, to the arrival of a primary user on the current channel. Generally, one device identifies to the other device a channel that it has found to be unused and of suitable quality. If the other device also finds the channel to be unused and of suitable quality, the identified channel is selected as the backup channel; otherwise, the other device proposes an alternate channel for consideration as the backup channel, and the process repeats. One of skill in the art will recognize that although this identification of a backup channel is particularly well suited for seamless switching of paired devices, the principles provided herein could also be applied for identifying a backup channel for all of the members of a network to use, using the aforementioned coordination and merging of channel classifications among the members of each network.

As noted above, the device is preferably configured to receive 155 and execute 160 commands that are either received directly from a user interface to the device, or via a MAC-layer management entity (MLME) or other network entity that is configured to provide network control services.

Figure 2:
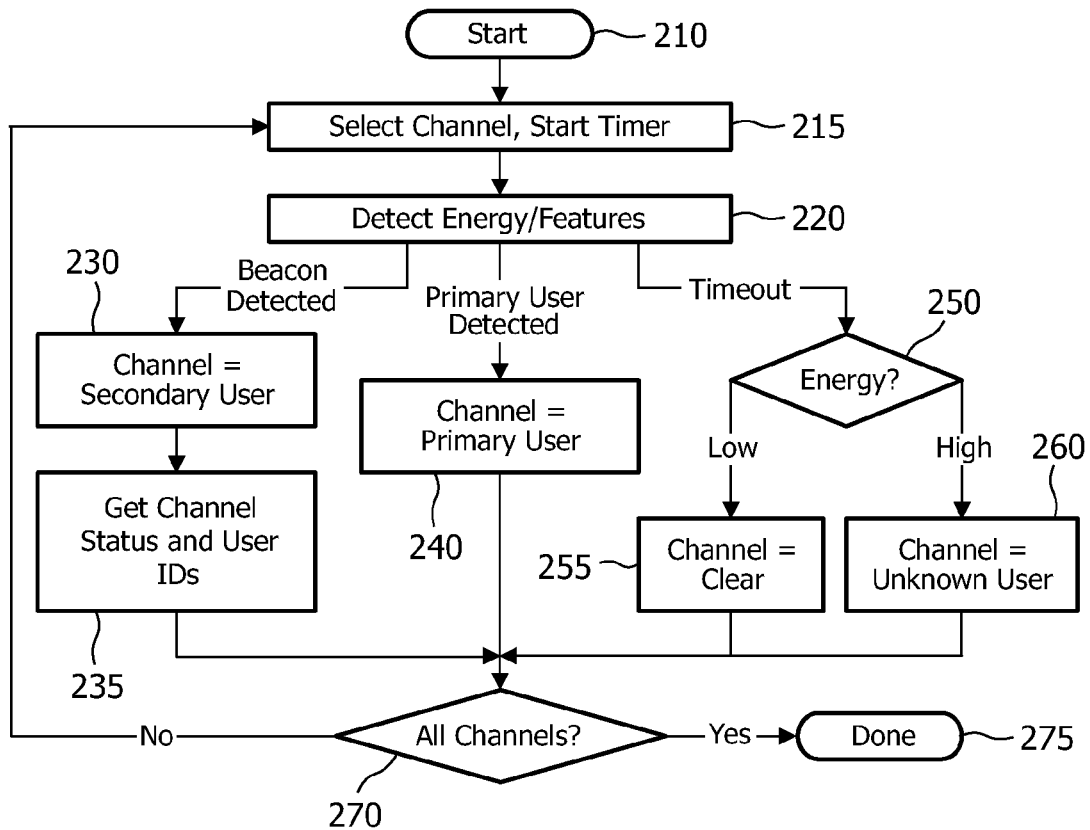
FIG. 2 illustrates an example flow diagram for scanning and classifying channels.

FIG. 2 illustrates an example flow diagram for scanning and classifying channels. The process starts at 210, corresponding to the start of execution of block 120 in FIG. 1.

At 215, a channel is selected from among the available channels in the spectrum, and a time-out timer is started. The device monitors for the presence of discernable energy in the selected channel, at 220.

Generally, the spectrum is identified as being allocated among a variety of primary users, and the presence of a primary user on a channel will exhibit distinguishable characteristics. For example, television broadcasts conform to a given standard, and the presence of carrier signals at particular locations within the frequency band of the transmission, can be used to identify a received signal as a television broadcast. A device that is configured to operate as a secondary user of the spectrum is preferably configured to recognize the distinguishing features of a primary user. If these features are detected, the channel is identified as being occupied by a primary user, at 240.

In like manner, a device that is configured to operate as a secondary user will include an ability to recognize other secondary users on the channel. For example, in accordance with WiMedia, as defined in Multiband OFDM MAC Layer Specification by the WiMedia Alliance, devices communicate using a MAC-layer "Superframe" wherein each active device transmits a beacon during a beacon period of the superframe, and each active device transmits data during allocated times of a data/sensing/sleep period of the superframe. A device that is configured to operate as a secondary user using this protocol will be configured to recognize the beacons of other secondary user devices. If the detected energy corresponds to the defined characteristics of other secondary user devices, the channel is identified as being occupied by secondary users, at 230.

The energy detection period ends when either primary or secondary users are detected, or when the aforementioned time-out timer expires. Upon timeout, the received unrecognized energy is assessed, at 250, to distinguish between an empty channel, exhibiting relatively low received energy level, and an occupied channel, exhibiting a relatively high received energy level. Conventional thresholding techniques distinguish 'high' and 'low' energy levels, typically based on a measure of accumulated energy over the time-out period. If the energy level is low, the channel is marked as clear, at 255; otherwise it is marked as being occupied by an unknown user, perhaps another secondary user device that is using an unrecognized protocol, at 260.

The classification of the selected channel is stored, and the process is repeated for each of the other channels in the spectrum until, at 270, all of the channels have been classified, and the process is terminated, at 275.

Figure 3:
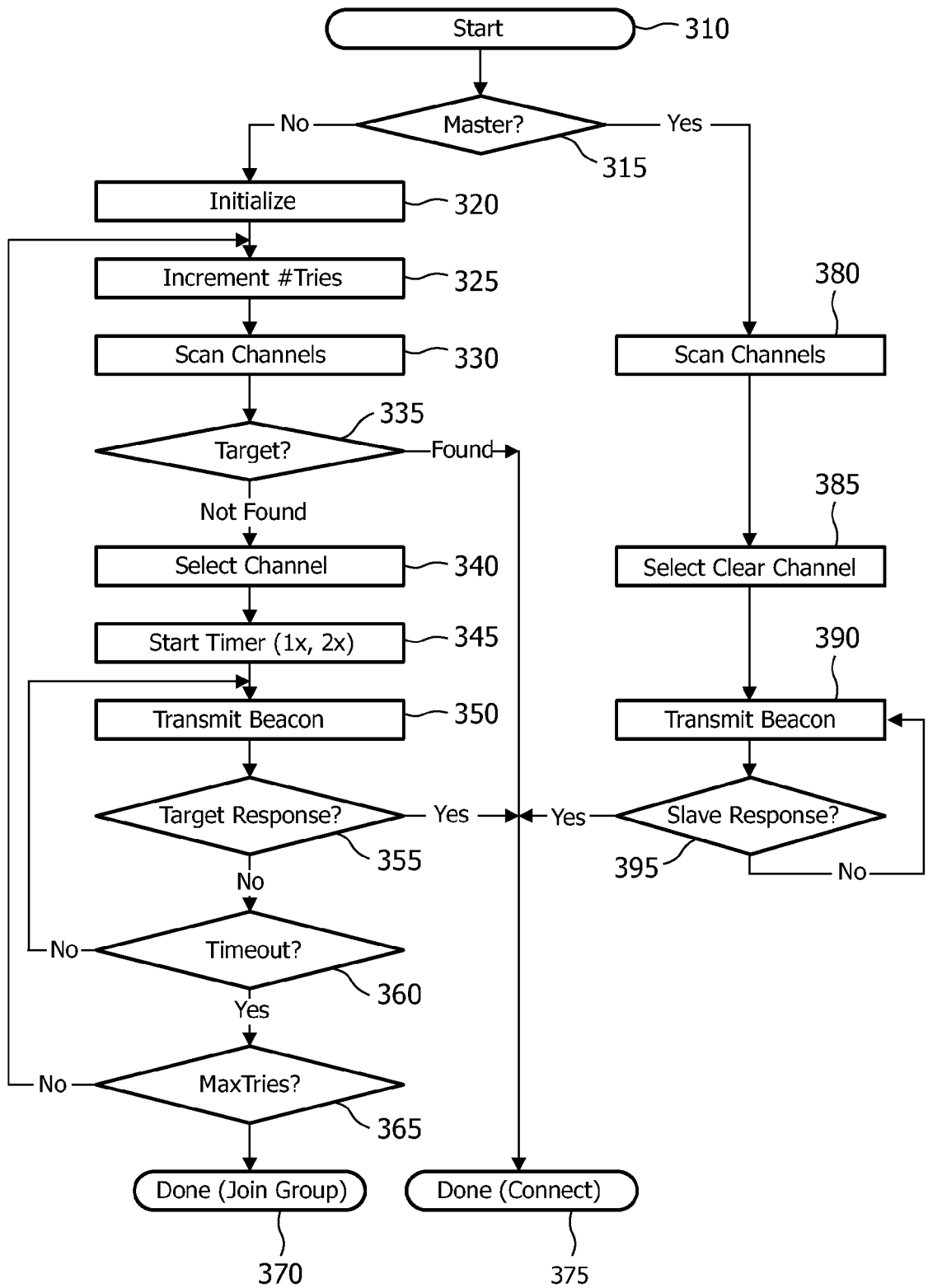
FIG. 3 illustrates an example flow diagram for pair target discovery.

FIG. 3 illustrates an example flow diagram for pair target discovery. The process starts at 310, corresponding to the start of execution of block 140 in FIG. 1.

If, at 315, the device is a master device of a master-slave pair, it is configured to advertise its presence on a clear channel, and wait for the slave/target device to find it. At 380, the master device scans and classifies each of the channels, using, for example the process of FIG. 2, discussed above. The master device selects a clear channel, at 385, and transmits its beacon, at 390. Alternatively, the master device may join an existing network of secondary users, and transmits its beacon within that network structure.

Unless otherwise directed, for example, via a user input or a command from an MLME (not illustrated), the master device continues to transmit its beacon until the slave device responds, at 395. The search process then terminates, at 375, followed by a pair connection process, discussed above with regard to block 145 of FIG. 1.

Otherwise, if the device is a slave device, or if the pair is not a master-slave pair, the device is configured to alternately search for the target device and advertise its presence for a given number of iterations. The iteration count ('#Tries') is initialized at 320 and incremented for each iteration at 325.

At 330, the device scans one or more channels, using a modified form of the flow diagram of FIG. 2. In a preferred embodiment, the scanning of channels will terminate as soon as the target device is found. Also in a preferred embodiment, if a primary user is located on a channel in a prior iteration, that channel is not rescanned in subsequent iterations. If the target is found, at 335, the search process terminates, at 375, and the pair proceeds to establish a connection, as discussed above with regard to block 145 of FIG. 1.

If the target device is not found, the searching device selects a channel that is either clear or occupied by a network of secondary users, at 340, and advertises its presence by transmitting a beacon that includes its device identifier, at 350. The device stays on the channel, advertising its presence, for a period of time established by the timer loop 345-360. The timeout duration is preferably set to assure that if the target device is also searching for this device, the likelihood of discovery is high. In a preferred embodiment, the minimum 'stay-duration' is at least as long as the maximum amount of time typically required to scan each of the channels (hereinafter a 'scan-duration'). To avoid the possibility of both searching devices being 'in sync', scanning and staying during coincident time periods, the stay-duration is randomized. In a preferred embodiment, the stay-time is randomly selected from a set of integer multiple of scan-durations; in a straightforward embodiment, the stay-duration is set at either the scan-duration or twice the scan duration, at 345.

If the target device responds to the searching device's beacon, at 355, the stay-duration loop is terminated, the search process is terminated, at 375, and the devices subsequently establish pair-communication (145 of FIG. 1). Otherwise, at the end 360 of the stay-duration, the number of iterations is checked to determine whether to quit the searching process, at 370. Generally, if the target is not found within a given number of iterations, or within a given amount of time, the searching device either joins an existing network or establishes a new network, as discussed above (125 of FIG. 1).

The choice of the number of iterations to use is generally dependent upon the particular device. In a typical embodiment, a portable device will be configured to repeat the pair-discovery process of FIG. 3 at regular 'wake-up' intervals, with a limited number of iterations within the process, to conserve battery power. Conversely, a plug-in device may continue the pair-discovery process for an extended period, or even indefinitely.

One of skill in the art will recognize that variations of the above processes are possible in view of this disclosure. For example, if the devices of the pair are user-controllable, one device may be set to act as a master device and stay on a selected channel, even if the pair is not a master-slave pair, per se, while the other device is set to search without staying on any channel, for example by selecting a stay-duration of zero.

Figure 4:
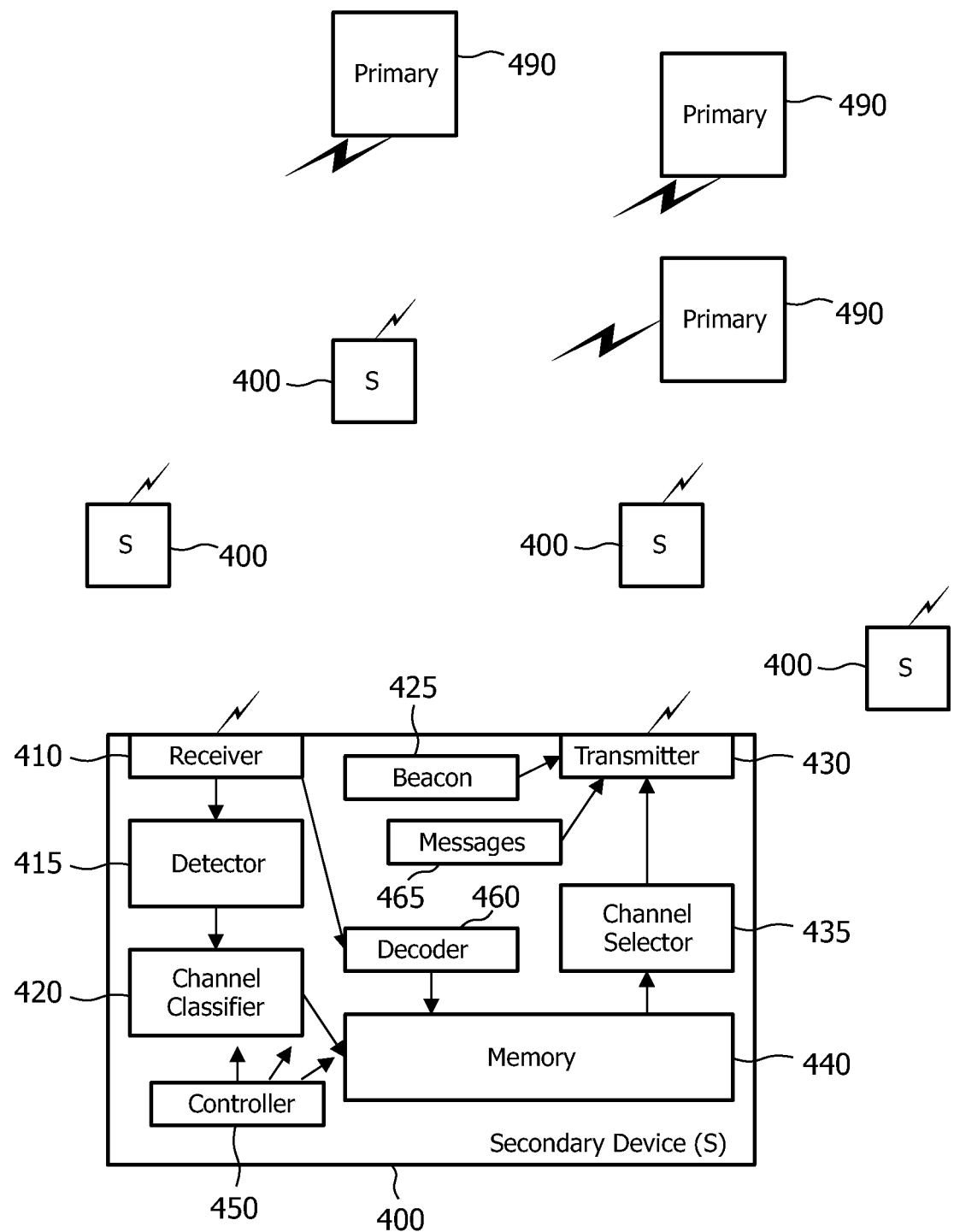
FIG. 4 illustrates an example system of dynamically re-locatable secondary user devices operating in an environment of primary users.

FIG. 4 illustrates an example system of dynamically relocatable secondary user devices (S) 400 operating in an environment of primary users (P) 490. As discussed above, the primary users 490 are generally the authorized and/or licensed users of available channels in a spectrum, and the secondary devices 400 are configured to avoid interfering with these primary users 490 while also using channels in the spectrum.

An example block diagram of one of the secondary devices 400 is illustrated in FIG. 4. The example device 400 includes a receiver 410 and detector 415 that are configured to monitor selected channels for signal or energy content, under the control of a controller 450. The channel classifier 420 receives the measures of energy and/or other characteristics of the monitored channel from the detector 415, and is configured to identify the channels as being occupied or unoccupied; and, if occupied, occupied by either a primary user 490, a secondary user 400, or an unknown user (not illustrated). The determined classification is stored in a memory 440. A decoder 460 is configured to process the received signals on channels occupied by other secondary users, to identify each other secondary user. The identity of each secondary user on each secondary-user channel is also stored in the memory 440. The decoder 460 also decodes messages from other users after communications are established on a selected channel.

The example device 400 also includes a beacon generator 425, or other generator for generating an identifying signal that is broadcast by a transmitter 430. The identifying signal is transmitted on a channel selected by a channel selector 435, under control of the controller 450, based on the classification and other determined characteristics of the channels stored in the memory 440. Messages 465 are transmitted after establishing communication on a selected channel.

Preferably, the controller 450 is configured to control the channel monitoring and beacon broadcasting consistent with the example flow diagrams of FIGS. 1, 2, and 3, detailed above. Of particular note, the controller 450 and channel selector 435 are configured to avoid transmitting on any channel that is classified as being occupied by a primary user, and, preferably, to avoid transmitting on any channel that is classified as being occupied by an unknown user. Preferably, the controller 450 also effects communications with the other secondary users to update its channel classifications based on classifications determined by the other secondary users.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements.

The invention claimed is:

1. A method comprising:
selecting a channel of a plurality of available channels;
monitoring the channel to determine whether the channel is being used and, when the channel is determined as being used, to classify the channel being used as being one of:
used by a primary user,
used by one or more secondary users,
used by an unknown class of users;
storing the determination of whether the channel is being used, and the classification of the channel when the channel is being used; and
repeating the selecting and monitoring until each of the plurality of available channels has been classified;
wherein when the channel is being used by one or more secondary users, storing an identification of each of the one or more secondary users of the channel;
and the method further comprising accessing the stored identification of each secondary user to locate a target user, and when the target user is located, joining a network on the channel associated with the identification of the target user.

2. The method of claim 1, wherein determining the channel as being used by one or more secondary users comprises detecting one or more beacon signals.

3. The method of claim 2, wherein determining the channel as being used by a primary user comprises detecting features that are characteristic of the primary user.

4. The method of claim 3, wherein determining the channel as being used by an unknown class of users comprises detecting energy above a threshold that does not correspond to one or more beacons and does not correspond to the features that are characteristic of the primary user.

5. The method of claim 1, comprising informing a user of the classifications of one or more of the plurality of available channels.

6. The method of claim 1, comprising when at least one channel is being used by one or more secondary users, joining a network on the at least one channel.

7. The method of claim 6, wherein joining the network is based on one of a user directive, association with at least one of the one or more secondary users, association with the network, a QoS characteristic of the network, and an amount of traffic on the network.

8. The method of claim 1, comprising when at least one channel is unused, transmitting an advertising beacon on the at least one channel.

9. The method of claim 1, comprising receiving another classification of a channel of the plurality of channels from one of the secondary users, and modifying the classification of the channel based on the other classification.

10. The method of claim 1, comprising transmitting the classification of one or more of the plurality of channels to one or more of the secondary users.

11. A method comprising:
scanning a plurality of channels for a beacon of a target device for a scan duration and when the beacon of the target device is not detected:
randomly selecting an advertise duration from among a set of predefined durations;
transmitting an advertising beacon on a select channel during the advertise duration;
and when a response to the advertising beacon is not received from the target device:
repeating the scanning of one or more of the plurality of channels and transmitting of the advertising beacon at another select channel; and
otherwise:
establishing communication with the target device.

12. The method of claim 11, comprising terminating the repeating, and transmitting the advertising beacon on one of the plurality of available channels.

13. The method of claim 12, wherein terminating the repeating is based on at least one of a predefined time limit, a predefined number of repetitions, a role of the target device, and a user input.

14. The method of claim 11, wherein selecting the select channel comprises selecting the select channel from among channels of the plurality of channels that do not exhibit use by a primary user.

15. The method of claim 11, wherein the repeating comprises storing a record of each scanned channel being one of used by a primary user, used by one or more secondary users, used by an unknown class of users.

16. The method of claim 11, wherein values of the set of predefined durations are dependent upon the scan duration.

17. The method of claim 16, wherein values of the set of predefined durations comprise the scan duration and twice the scan duration.

18. The method of claim 11, wherein the one or more of the plurality of channels are selected from among channels at which a primary user was not detected during the scanning.

19. A method of network discovery by a device among a plurality of channels having primary and secondary users, comprising:
when the device is paired with a target device:
when the device is not a master of a master-slave pair:
scanning a plurality of channels for a beacon of the target device for a scan duration;
when the beacon of the target device is not detected:
transmitting an advertising beacon on a select channel during an advertise duration;
when a response to the advertising beacon is not received from the target device, repeating the scanning of one or more of the plurality of channels and transmitting of the advertising beacon at another select channel;
otherwise, when the device is the master of the master-slave pair, transmitting an advertising beacon on a select channel;
establishing communication with the target device;
otherwise, when the device is not paired with the target device:
selecting a channel of the plurality of available channels;
monitoring the channel to determine a classification of the channel based at least upon whether a primary or secondary user is detected;
storing the classification of the channel;
repeating the selecting and monitoring until each of the plurality of available channels has been classified;
selecting a select channel from among one or more of the plurality of channels at which at least one secondary user is detected, and
establishing communication with the at least one secondary user on the select channel.

20. An apparatus comprising:
a receiver;
a transmitter;
a controller that is configured to control the receiver to tune to each channel of a plurality of channels;
a channel classifier that is configured to determine a classification of each channel as being one of:
used by a primary user,
used by one or more secondary users,
used by an unknown class of users;
a memory that is configured to store the classification of each channel;
wherein when the channel is being used by one or more secondary users, the memory is further configured to store an identification of each of the one or more secondary users of the channel,
wherein the controller is configured to control the transmitter to selectively effect each of:
accessing the stored identification of each secondary user to locate a target user, and when the target user is located, joining a network on the channel associated with the identification of the target user; and
establishing a network on a select channel that is unused.

21. The apparatus of claim 20, wherein the controller is configured to selectively join the network based on one of a user directive, association with at least one of the one or more secondary users, association with the network, a QoS characteristic of the network, and an amount of traffic on the network.

22. An apparatus comprising:
a receiver;
a transmitter;
a controller that is configured to:
control the receiver to scan each of a plurality of channels for a beacon of a target device for a scan duration;
when the beacon of the target device is not detected:
randomly select an advertise duration from among a set of predefined durations;
control the transmitter to transmit an advertising beacon on a select channel during the advertise duration;
when a response to the advertising beacon is not received from the target device, repeating the control of the receiver to scan one or more of the plurality of channels and the control of the transmitter to transmit the advertising beacon at another select channel; and
otherwise, when the target device is detected, control the transmitter and receiver to establish communication with the target device.

23. The apparatus of claim 22, wherein the controller is configured to terminate the repeating of the scan of the one or more of the plurality of channels based on at least one of a predefined time limit, a predefined number of repetitions, a role of the target device, and a user input; and transmitting the advertising beacon on one of the plurality of available channels.

* * * * *